(12) United States Patent
Zhang et al.

(10) Patent No.: US 9,367,821 B2
(45) Date of Patent: Jun. 14, 2016

(54) SYSTEM AND METHOD FOR PROFILING REQUESTS IN SERVICE SYSTEMS

(71) Applicant: NEC Laboratories America, Inc., Princeton, NJ (US)

(72) Inventors: Hui Zhang, Princeton Junction, NJ (US); Xia Ning, Plainsboro, NJ (US); Junghwan Rhee, Princeton, NJ (US); Guofei Jiang, Princeton, NJ (US); Hongteng Xu, Atlanta, GA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/839,363

(22) Filed: Aug. 28, 2015

(65) Prior Publication Data
US 2016/0063398 A1   Mar. 3, 2016

Related U.S. Application Data

(60) Provisional application No. 62/045,308, filed on Sep. 3, 2014.

(51) Int. Cl.
*G06N 99/00* (2010.01)
*G06F 9/50* (2006.01)

(52) U.S. Cl.
CPC ............ *G06N 99/005* (2013.01); *G06F 9/5011* (2013.01)

(58) Field of Classification Search
None
See application file for complete search history.

(56) References Cited

U.S. PATENT DOCUMENTS

| 2014/0109112 A1* | 4/2014 | Zhang | G06F 9/542 719/318 |
| 2014/0115403 A1* | 4/2014 | Rhee | G06F 11/3636 714/38.1 |

OTHER PUBLICATIONS

Kapil Vaswani, Efficient Online Path Profiling; Oct. 2007, Department of Computer Science, Indian Institute of Science.*
Sambasivan et al., Diagnosing performance changes by comparing request flows, 2011, NSDI.*
Sambasivan et al., Diagnosing performance changes by comparing system behaviours, Jul. 2010, Carnegie Mellon University.*
B. C. Tak et al., "vPath: Precise Discovery of Request Processing Paths from Black-Box Observations of Thread and Network Activities," In Proceedings of the 2009 conference on USENIX Annual technical conference, USENIX'09, Jun. 14-19, 2009, pp. 19-19, Berkeley, CA, USA, USENIX Association.

* cited by examiner

*Primary Examiner* — Alan Chen
(74) *Attorney, Agent, or Firm* — Joseph Kolodka

(57) ABSTRACT

A system and method for profiling a request in a service system with kernel events including a pre-processing module configured to obtain kernel event traces from the service system and determine starting and ending communication pairs of a request path for a request. A learning module is configured to learn pairwise relationships between the starting and ending communication pairs of training traces of sequential requests. A generation module is configured to generate communication paths for the request path from the starting and ending communication pairs of testing traces of concurrent requests using a heuristic procedure that is guided by the learned pairwise relationships and generate the request path for the request from the communication paths. The system and method precisely determine request paths for applications in a distributed system from kernel event traces even when there are numerous concurrent requests.

16 Claims, 4 Drawing Sheets

SYSTEM AND METHOD FOR PROFILING REQUESTS IN SERVICE SYSTEMS

RELATED APPLICATION INFORMATION

This application claims priority to provisional application Ser. No. 62/045,308, filed on Sep. 3, 2014, incorporated herein by reference.

BACKGROUND

1. Technical Field

The present invention relates to computer systems, and more particularly, service systems with kernel events.

2. Description of the Related Art

Multi-tier applications are currently being developed with increasing software complexity along with higher user expectations on service quality. A retracing of the history of execution flows of individual requests within and across the components of a distributed system is often necessary in order to find out the root cause of software problems. However, the prediction of internal states of all relevant components of a system when an unexpected problem occurs has been difficult to achieve. For example, retracing the history of execution flows is cumbersome and tricky due to the overwhelming number of hardware and software combinations, different workload characteristics, and usage patterns of end users.

Kernel event traces are time sequences of low-level system events, such as system calls, scheduling events, interrupts, I/O operations, locking operations, etc. The kernel events are a combination of various request paths which are end to end paths of kernel events responding to external requests. Determining request paths from kernel event traces is difficult when the system is processing numerous requests concurrently because the request paths are highly interleaved with each other. A system and device which enables understanding system execution, such as profiling request paths from system kernel events, in a transparent manner, with minimal overhead, would be highly advantageous.

SUMMARY

A method for profiling a request in a service system with kernel events including the steps of obtaining kernel event traces from the service system; pre-processing the kernel event traces in order to determine starting and ending communication pairs of a request path for the request; learning pairwise relationships between the starting and ending communication pairs; generating communication paths for the request path from the starting and ending communication pairs using a heuristic procedure that is guided by learned pairwise relationships; and generating the request path for the request.

A system for profiling a request in a service system with kernel events which includes a pre-processing module configured to obtain kernel event traces from the service system and determine starting and ending communication pairs of a request path for a request. A learning module is configured to learn pairwise relationships between the starting and ending communication pairs of training traces of sequential requests. A generation module is configured to generate communication paths for the request path from the starting and ending communication pairs of testing traces of concurrent requests using a heuristic procedure that is guided by learned pairwise relationships. The generation module is also configured to generate the request path from the test traces for the request from the communication paths.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for profiling requests in service systems. The system and method are configured to reconstruct execution traces of a request in a service system with kernel event traces. The system and method determine request paths from event traces by learning pairwise relationships between communication pairs of sequential requests in order to infer communication paths and generate request paths. The system and method precisely discovers request paths for applications in a distributed system from kernel event traces even when there are numerous concurrent requests.

Embodiments described herein may be entirely hardware, entirely software or may include both hardware and software elements which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
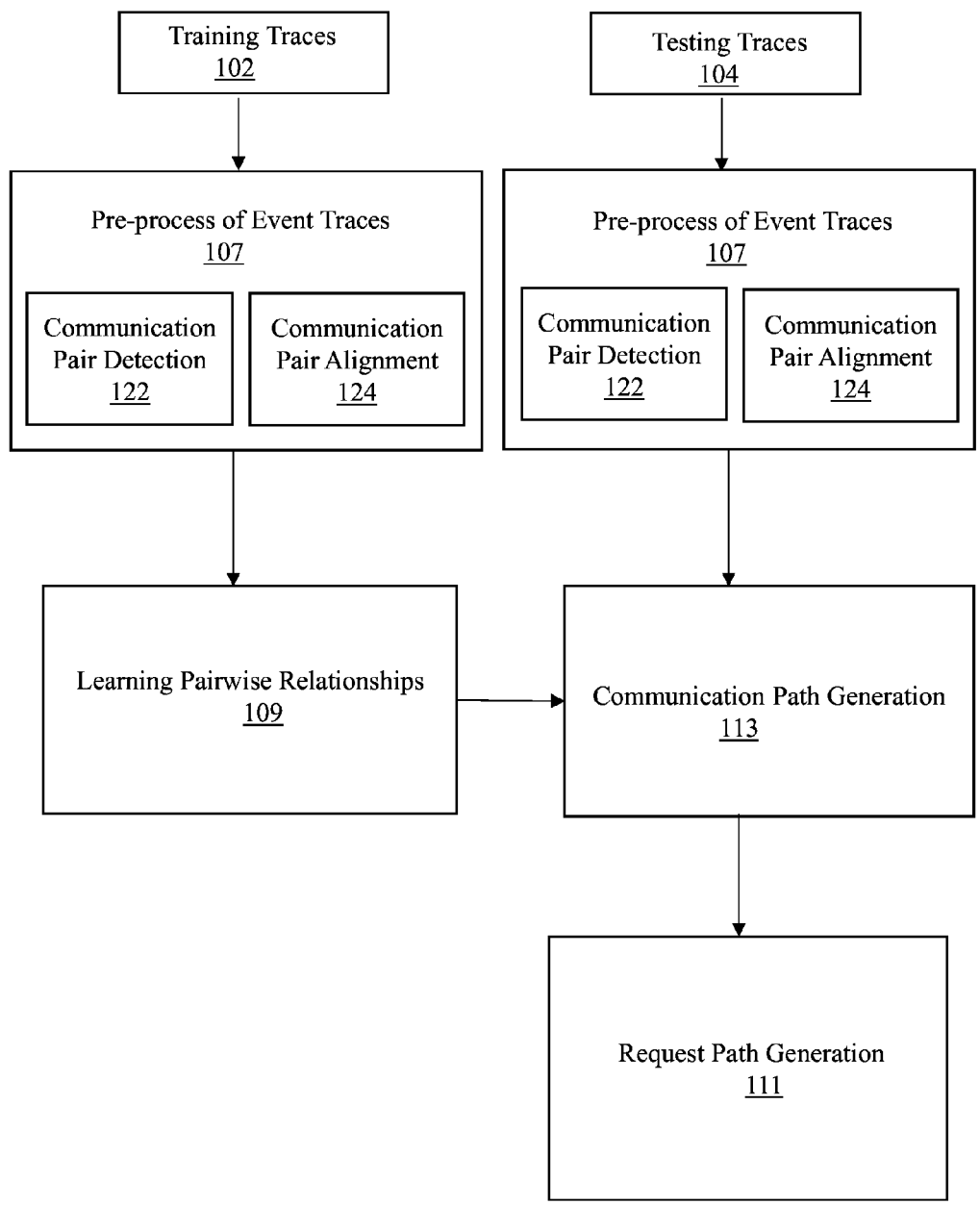
FIG. 1 is a block/flow diagram illustratively depicting a framework for a system for profiling requests in service systems in accordance with the present principles.

Referring now to FIG. 1, a block/flow diagram illustratively depicting a framework for a system 100 for profiling concurrent requests in service systems with kernel events is shown in accordance with one embodiment of the present principles.

Figure 2:
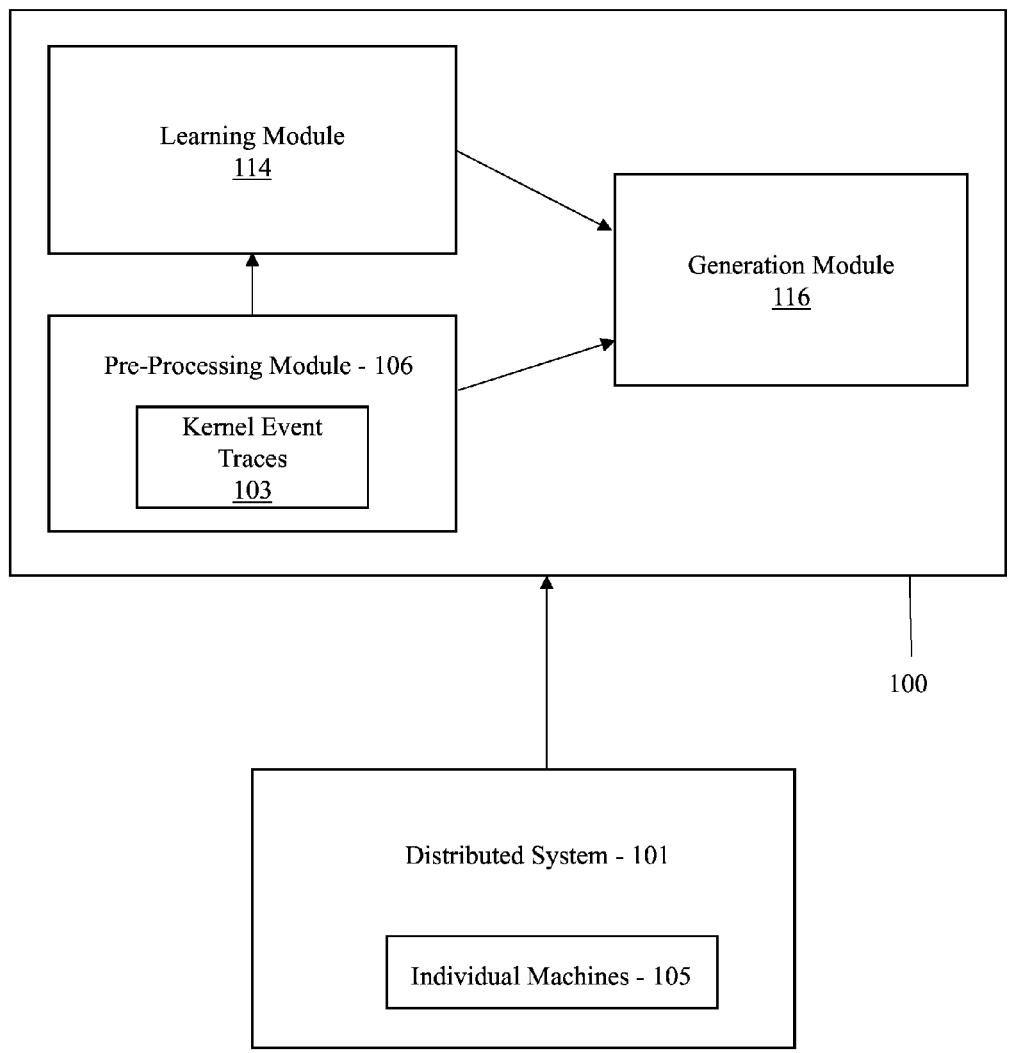
FIG. 2 is a block/flow diagram illustratively depicting a system for profiling requests in service systems in accordance with the present principles.

As shown in FIGS. 1-2, the system 100 includes a pre-processing module 106 that is configured to pre-process 107 kernel event traces 103. The pre-processing module 106 is configured to collect kernel event traces related to communication among threads from individual service machines 105 of a distributed system 101. The events representing communication between threads always appears in a pair forming a communication pair. In one embodiment, the system 100 obtains kernel event traces 103 from individual service machines by instrumenting core kernel functions, including system-level operating system calls. However, in other embodiments, the pre-processing module 106 is configured to utilize other techniques known in the art to obtain kernel event traces 103 from individual service machines.

Figure 3:
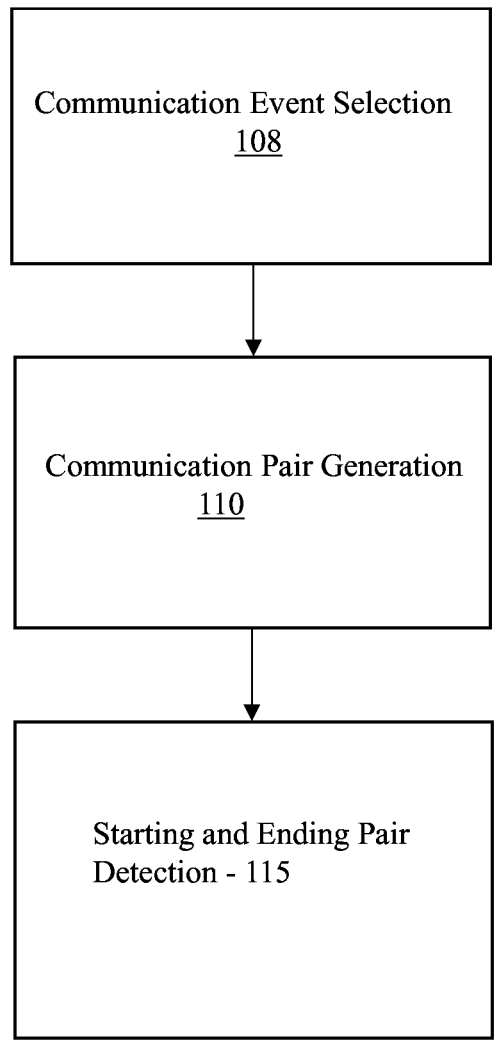
FIG. 3 is a block/flow diagram illustratively depicting a framework for the preprocessing of event traces performed by the system for profiling requests in service systems in accordance with the present principles.

Referring now to FIG. 3, a block/flow diagram illustratively depicting the framework for the pre-processing of kernel event traces 103 by the pre-processing module 106 is shown in accordance with one embodiment of the present principles. The pre-processing module 106 is configured to select 108 communication related events from the original kernel event traces 103. In one embodiment, a communication event list may be provided in advance in order to make the determination. The pre-processing module 106 is configured to output a sequence of the communication events. In a preferred embodiment, the pre-processing module 106 is configured to output the communication event including the event type, the related parameters for each event and the time of the event.

The parameters of the event may include the source Internet Protocol address ("IP") of the machine generating the event, the IP of the machine responding to the event, the identification of the thread generating the event, the identification of the central processing unit generating the event, the source port and destination port number assigned to the event, etc.

The pre-processing module 106 is also configured to generate 110 communication pairs 110 after the communication events have been selected. The pre-processing module 106 is configured to generate 110 communication pairs by iteratively detecting 122 communication pairs and aligning 124 time clocks of the machines in an alternative manner.

In one embodiment, the pre-processing module 106 is configured to perform a first phase of detection 122 of a communication pair by analyzing each event in the communication sequence. The pre-processing module 106 is configured to take an event that has not been detected before as a center and define a sliding window which includes a predetermined number of preceding events and following events. The pre-processing module 106 is configured to find a closest matching event by analyzing the event type, the parameters of the starting event and ending event and the timing of the events.

For example, the event types for the communication pairs may match a known starting event and ending event for that communication event as provided in a table. The parameters of the starting event may satisfy pre-determined conditions. In one embodiment, the conditions of the parameters that the starting and ending events must satisfy are as follows:

For SETRQ (or CREATE), find PRESUME having larger time stamp and same thread ID as the one contained as a parameter of SETRQ (or CREATE).

For UNIX_STREAM_RECV (or PIPEWRITE), find UNIX_STREAM_SEND (or PIPEREAD) having larger time stamp and same source STREAM (or PIPE) parameters.

For TCP_CONNECT (or TCP_SEND), find TCP_ACCEPT (or TCP_RECV) satisfying the following: 1) its source IP and destination IP are exchanged; and 2) its source port and destination port are exchanged.

For TCP_SHUTDOWN (or TCP_CLOSE), find TCP_RECV satisfying the following: 1) its source IP and destination IP are exchanged; 2) its source port and destination port are exchanged; and 3) its data size is zero As an example, if the event type is a TCP Send event, the system is configured to find a corresponding TCP Receive statement wherein the source IP and destination IP are exchanged and the ports are exchanged.

If a matching event is found, the pre-processing module 106 is configured to generate the communication pair 110 which includes the initial event and the matching event and label these events as detected events. If the pre-processing module 106 does not find the matching event, the system is configured to determine whether the event belongs to an external request or feedback. If the pre-processing module 106 determines that the event is an external request or feedback, the system is configured to save the event itself as a pair and label the event as detected.

Since different machines 105 of the distributed system have different time clocks, events belonging to different machines must be synchronized by time alignment. The pre-processing module 106 is configured to perform this second phase of time alignment 124 by identifying a first and second machine and finding event pairs having a beginning event belonging to the first machine and an ending event belonging to the second machine. The pre-processing module 106 is configured to utilize the time stamps for the beginning event and ending event in order to learn a constrained linear regression model in order to align the time stamps. The communication pair detection phase 122 may be reformulated as a graph matching problem.

For example, in one embodiment, the constrained linear regression model is as follows:

$$\min_{a,b} \sum_{n=1}^{N} |at_i^n + b - t_j^n|^2$$

$$\text{s.t. } at_i^n + b \le t_j^n \text{ for } n = 1, \ldots, N.$$

Wherein the time stamps are $\{t^n_i\}$ and $\{t^a_j\}$ for the source machine for the beginning event and ending event, respectively.

The pre-processing module 106 is configured to align 124 the time stamps iteratively with the communication pair detection 122 phase in an alternating manner. The pre-processing module 106 is configured to determine whether the maximum number of iterations is reached. If the pre-processing module 106 determines that the maximum number has not been reached, the pre-processing module is configured to continue to perform the time alignment 124 procedure. If the system determines that the maximum number of iterations has been reached, the system is configured to output the communication pairs that were detected and aligned.

The pre-processing module 106 is configured to detect the starting point and ending point of a request path. The pre-processing module 106 is configured to analyze the detected communication pairs and determine 115 which pairs are starting pairs in the communication path. In a preferred embodiment, the pre-processing module 106 utilizes a specific rule for determining starting pairs. For example, in one embodiment, a rule of $C_{start}$ pairs is: matching <---, $e_{end}$>, where "---" means empty and $e_{end}$ is the event corresponding to an external request.

For each starting pair, the pre-processing module 106 is configured to find the corresponding ending pair which satisfies a rule defining ending pairs. The starting and ending pairs of request paths may be empty. For example, in one embodiment, the rule for defining ending pairs is that the ending pair appears behind the starting pair, there are at least 6 pairs between them and the event type and parameter of the ending pair matches with those of the starting pair. As an example, in one embodiment where the starting pair is <---, TCP_RECV>, the corresponding ending pair is <TCP_SEND, --->, whose destination IP corresponds to the same external machine with the starting pair and the port pair matches with each other.

Referring now to FIGS. 1-4, a learning module 114 is configured to learn 109 the pairwise relationship between starting and ending communication pairs of sequential requests from the pre-processed kernel event traces generated by the pre-processing module 106. Although request paths are various, the pairwise relationships between communication pairs are relatively stable. As a result, pairwise patterns of communication pairs may be learned from kernel event traces corresponding to sequential requests. These patterns provide significant information for inferring concurrent request paths. The event traces that the learning module 114 is configured to learn relationships therebetween are considered training traces 102.

The learning module may be configured to learn the pairwise relationship between communications pairs by estimating 118 an event transition probability for each communication pair and then estimating 120 parameter conditional probability for each pair.

In one embodiment, the learning module 114 is configured to estimate event transition probability from a set of sequences by initializing a matrix T, whose size is N times $N^2$ wherein elements are zeros and N is equal to the number of communication pair types. The learning module 114 is configured to segment each sequence into paths according to the starting and ending pairs detected by the pre-processing module 106. In one embodiment, the learning module 114 is configured to estimate event transition probability by utilizing the following algorithm:

The paths may be denoted as $\{C_i\}_m$, i=1, . . . ,$I_m$, m=1, . . . , M;

For each path $\{C_i\}_m$,
For i=1, . . . , $I_m$,
For triple $\{C_{i-1}, C_i, C_{i+1}\}$,
If $C_{i-1}$ is the k-th type of communication pair, $C_i$ is the c-th type of communication pair and $C_{i+1}$ is the r-th type of communication pair, then T(r, N(k−1)+c)=T(r, N(k−1)+c)+1, where T(r, N(k−1)+c) is the element at the r-th row, (N(k−1)+c)-th column;
Each column of T is then normalized.

In one embodiment, the learning module 114 may be configured to estimate parameter conditional probability by feature extraction. In one embodiment, the algorithm that is utilized by the learning module 114 to extract features of parameters and estimate parameter conditional probability is as follows:

For each path $\{C_i\}_m$;
For i=1, . . . , $I_m$,
Given the ending event $e_{end}$ of $C_i$ and the starting event $e_{start}$ of $C_{i+1}$, calculate a variable $f_1$, where $f_1$ is 0 if the port pair of $e_{end}$ is equal to that of $e_{start}$, and 1 otherwise;
Calculate a variable $f_2$, where $f_2$ is 0 if the CPU ID of $e_{end}$ is equal to that of $e_{start}$, and 1 otherwise;
Calculate a variable $f_3$, where $f_3$ is 0 if the thread ID of $e_{end}$ is equal to that of $e_{start}$, and 1 otherwise;
Calculate a variable $f_4$, where $f_4$ is 0 if the source IP of $e_{end}$ is equal to that of $e_{start}$, and 1 otherwise;
Calculate a variable $f_5$, where $f_5$ is 0 if the destination IP of $e_{end}$ is equal to that of $e_{start}$, and 1 otherwise;
The learning module 114 is configured to calculate the parameter feature as $f=16f_5+8f_4+4f_3+2f_2+f_1+1$;
In one embodiment, the learning module 114 is configured to estimate conditional probability as follows:
If $C_i$ is the c-th type of communication pair and $C_{i+1}$ is the r-th type of communication pair, then F(f, N(c−1)+r)=F(f, N(c−1)+r)+1, where F(f, N(c−1)+r) is the element at the f-th row, (N(c−1)+r)-th column;
The learning module 114 is then configured to normalize the column of F and output T and F.

A generation module 116 is configured to generate communication paths, each of which corresponds to a request path for concurrent requests utilizing the sequence of communication pairs detected in the pre-processing of event traces and the pairwise relationship determined by the learning module 114. The kernel event traces processed by the generation module 116 are considered testing traces 104 since the generation module processes these traces utilizing the information obtained from pre-processing 107 the event traces and learning 109 the pairwise relationships of the training traces 102. The generation module 116 is configured to generate communication paths in a step-by-step manner wherein a local optimal solution is achieved by solving a generalized assignment problem. In one embodiment, the communication path is generated by a heuristic algorithm that is guided by the pairwise relationship determined by the learning module 114.

The generation module 116 is configured to select candidates for a communication pair that has the potential to be the following communication pair for a specific communication pair in a communication path. The generation module 116 is configured to select candidates based on a second order determination process. The first order is that the generation module is configured to determine candidates based on domain knowledge. For example, thread transitions caused by a specific request may only result in three connection patterns between adjacent communication pairs. This knowledge is used to select the candidate for the next communication pair in the sequence.

In order to provide a more robust determination, the generation module is configured to utilize a second order procedure to select candidates. The second order may be that the generation module is configured to determine whether the candidate satisfies specific criterion concerning the parameters. In one embodiment, the criterion is as follows:

The starting event of candidate has the same thread ID with the ending event of $C_i$ or that of $C_{i-1}$;
The ending event of candidate has the same thread ID with the ending event of $C_i$ or that of $C_{i-1}$;
The starting event of candidate has the same thread ID with the starting event of $C_i$ or that of $C_{i-1}$;

The generation module 116 is configured to perform these generalized assignment problems step by step. In each step a bipartite graph is composed. The nodes are pairs found according to domain knowledge and the weights of edges are calculated according to the learned pairwise relationships.

In one embodiment, the candidate selection is performed using the following algorithm:

The communication path is denoted as $p_n=\{C^n_i\}$, $i=1, \ldots, I_n$, $n=1, \ldots, N$; the starting pairs and the ending pairs are denoted in the sequence as $C^n_{start}$, $C^n_{stop}$, $n=1, \ldots, N$.

Initialize each path as $p_n=C^n_{start}$, and the pointer for each path as $C^n_j=C^n_{start}$, $n=1, \ldots, N$;

For $n=1, \ldots, N$;

find M−1 preceding pairs of $C^n_j$ from $p_n$, 0<M<K+1. K is defined by the learning module 114. Denote the clip of sequence as $\{C^n_{j-m+1}, \ldots, C^n_j\}$. If there are no preceding pairs, the clip is $\{C^n_j\}$.

Initialize the candidate set $D_n$ of the following pair of $C^n_j$ as an empty set. For all pairs $\{C_q\}$ between $C^n_j$ and $C^n_{stop}$;

If $C_q$ is not in existing paths $\{p_n\}$, $n=1, \ldots, N$ and at least one of following conditions is hold:

1. The thread ID of the starting event in $C_q$ is equal to that of the ending event in $C^n_j$, and the time stamp of the starting event in $C_q$ is larger than that of the ending event in $C^n_j$;

2. The thread ID of the starting event in $C_q$ is equal to that of the starting event in $C^n_j$, and the time stamp of the starting event in $C_q$ is larger than that of the starting event in $C^n_j$;

3. The thread ID of the ending event in $C_q$ is equal to that of the ending event in $C^n_j$, and the time stamp of the ending event in $C_q$ is larger than that of the ending event in $C^n_j$;

4. The thread ID of the starting event in $C_q$ is equal to that of the ending event in $C^n_{j-1}$, and the time stamp of the starting event in $C_q$ is larger than that of the ending event in $C^n_{j-1}$;

5. The thread ID of the starting event in $C_q$ is equal to that of the starting event in $C^n_{j-1}$, and the time stamp of the starting event in $C_q$ is larger than that of the starting event in $C^n_{j-1}$;

6. The thread ID of the ending event in $C_q$ is equal to that of the ending event in $C^n_{j-1}$, and the time stamp of the ending event in $C_q$ is larger than that of the ending event in $C^n_{j-1}$; then $D_n=D_n \cup C_q$.

The generation module 116 is also configured to conduct a follower assignment procedure based on a bipartite graph composed of D and S. In one embodiment, the follower assignment procedure is conducting utilizing the following algorithm:

Denote $D=U^N_{n=1} D_n$; $S=U^N_{n=1} C^n_j$; The weight of edge connecting the element in D with that in S, denoted as $w_{sd}$, is calculated as follows:

For the s-th element in S, denoted as s, and the d-th element in D, denoted as d;

If $s=C^n_j$ and d in $D_n$, then $$w_{sd} = F(f, z) \sum_{m=1}^{M} T(r, c_m, m),$$

where r is the type index of d and $c_m$ is the type index of $C^n_{j-M+m}$. $F(f, z)$ is the parameter conditional probability given transition from s to d, which is calculated by the method in 302.b.

Else, $w_{sd}=0$;

Find the follower for each $C^n_j$ by solving following binary programming problem:

$$\max_{x_{sd}} w_{sd} x_{sd}$$

$$\text{s.t.} \sum_s x_{sd} \leq 1 \text{ for } d = 1, \ldots, |D|$$

$$\sum_d^s x_{sd} = 1 \text{ for } s = 1, \ldots, |S|$$

$$x_{sd} = \{0, 1\}$$

After obtaining $x_{sd}$, for each $s=C^n_j$, the d with $x_{sd}=1$ is the follower.

Update $C^n_j=d$, $p_n=p_n \cup d$. Go back to candidate selection.

The generation module 116 views the graph and determines pairwise transitions by solving these generalized assignment problems. The system 100 finds paths of requests robustly and effectively even in situations where there are highly-overlapped event paths.

The generation module 116 is also configured to perform request path generation 111. After inferring communication paths 113, the corresponding request paths are obtained by filling adjacent communication pairs, $\{C_i, C_{i+1}\}$, by the events having the same thread ID with the ending event of $C_i$.

Figure 4:
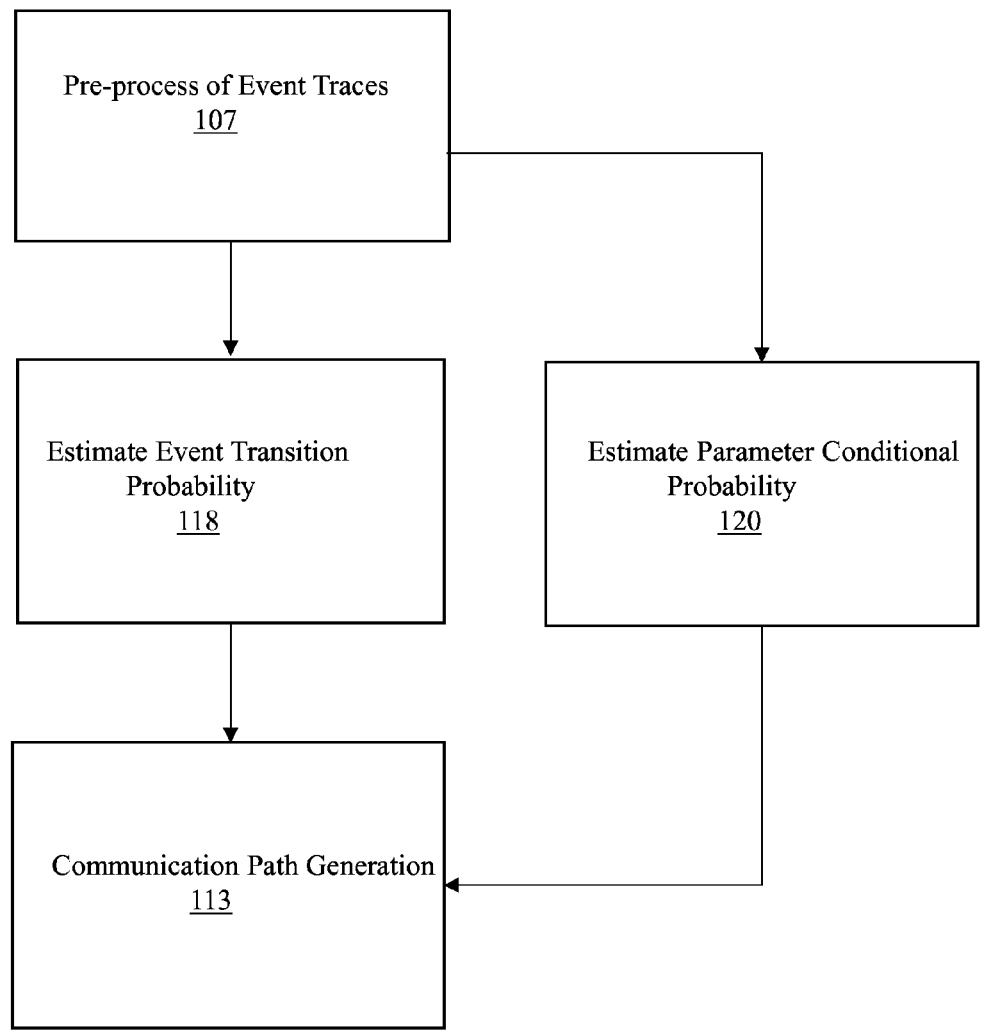
FIG. 4 is a block/flow diagram illustratively depicting a framework for learning pairwise relationships performed by the system for profiling requests in service systems in accordance with the present principles.

Referring to FIGS. 1 and 3-4, the present invention is also directed to methods for profiling requests in service systems with kernel events as previously described. The method may be performed by any combination of hardware and/or software.

While the above configuration and steps are illustratively depicted according to one embodiment of the present principles, it is contemplated that other sorts of configurations and steps may also be employed according to the present principles. While various components have been illustratively described as separate components, the components may be formed in a variety of integrated hardware or software configurations.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for profiling a request in a service system with kernel events comprising, obtaining kernel event traces from the service system;

pre-processing the kernel event traces in order to determine starting and ending communication pairs of a request path for the request;

learning pairwise relationships between the starting and ending communication pairs of training traces of sequential requests;

generating communication paths for the request path from the starting and ending communication pairs of testing traces of concurrent requests using a heuristic procedure that is guided by learned pairwise relationships; and
generating the request path for the request.

2. The method as recited in claim 1, wherein pre-processing the kernel event traces includes the steps of iteratively finding communication pairs in the kernel event traces and aligning time clocks for a plurality of machines that provided the communication pairs in an alternating manner.

3. The method as recited in claim 2, wherein the step of aligning time clocks of machines is performed utilizing a constrained linear regression model.

4. The method as recited in claim 1, wherein pre-processing the kernel event includes the step of outputting a communication event type, parameters for a communication event and a time of the communication event.

5. The method as recited in claim 1, wherein pre-processing the kernel event includes the step of detecting communication pairs comprising finding a closest matching event to a first event by comparing an event type, parameters of an event and a time of an event for the first event with other kernel events.

6. The method as recited in claim 1, wherein the step of learning a pairwise relationship between the starting and ending communication pairs includes estimating an event transition probability and a parameter conditional probability for the communication pairs.

7. The method as recited in claim 1, wherein:
the communication paths are generated in a step-by-step manner by composing a bipartite graph;
the nodes are pairs found according to domain knowledge; and
weights of edges are determined according to the learned pairwise relationships.

8. The method as recited in claim 1, wherein generation of communication paths further includes the steps of:
selecting candidates for a next communication pair in a sequence; and
performing a follower assignment procedure.

9. A non-transitory computer readable storage medium with instructions for a computer for profiling a request in a service system with kernel events comprising,
obtaining kernel event traces from the service system and determine starting and ending communication pairs of a request path for a request;
a learning module configured to learn pairwise relationships between the starting and ending communication pairs of training traces of sequential requests; and
a generation module configured to:
generate communication paths for the request path from the starting and ending communication pairs of testing traces of concurrent requests using a heuristic procedure that is guided by learned pairwise relationships; and
generate the request path for the request from the communication paths.

10. The non-transitory computer readable storage medium as recited in claim 9, wherein the pre-processing module is configured to iteratively find communication pairs in the kernel event traces and align time clocks of machines that provided the communication pairs in an alternating manner.

11. The non-transitory computer readable storage medium as recited in claim 10, wherein the pre-processing module is configured to align time clocks of machines by utilizing a constrained linear regression model.

12. The non-transitory computer readable storage medium as recited in claim 9, wherein the pre-processing module is configured to output a communication event type, parameters for a communication event and a time of the communication event.

13. The non-transitory computer readable storage medium as recited in claim 9, wherein the pre-processing module is configured to detect communication pairs by comparing a communication event type, parameters of a communication event and a time of a communication event for a first event with other kernel events in order to find a closest matching event to the first event.

14. The non-transitory computer readable storage medium as recited in claim 9, wherein the learning module is configured to estimate an event transition probability and a parameter conditional probability for the communication pairs in order to learn the pairwise relationships.

15. The non-transitory computer readable storage medium as recited in claim 9, wherein the generation module is configured to:
generate the communication paths in a step-by-step manner by composing a bipartite graph;
identify nodes as a communication pair based on domain knowledge; and
determine weights of edges according to the learned pairwise relationships.

16. The non-transitory computer readable storage medium as recited in claim 9, wherein the generation module is configured to:
select candidates for a next communication pair in a sequence; and
conduct a follower assignment procedure in order to generate communication paths.

* * * * *